Nov. 24, 1936. A. J. FISHER 2,061,760
DIVISION MOLDING FOR A WINDSHIELD
Filed July 5, 1935 2 Sheets-Sheet 1
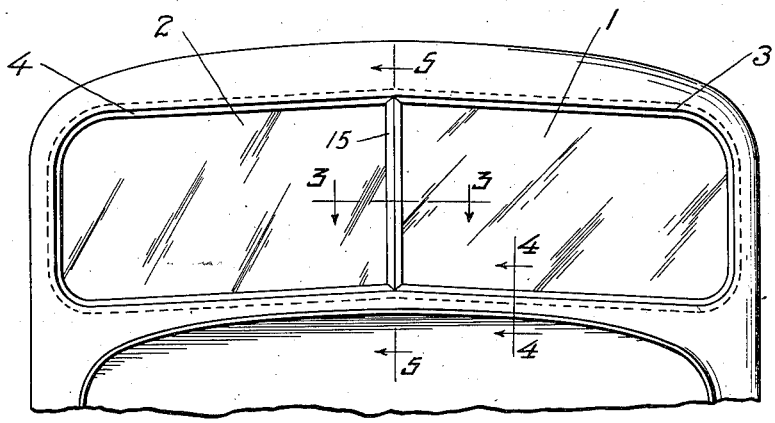
Fig. 1
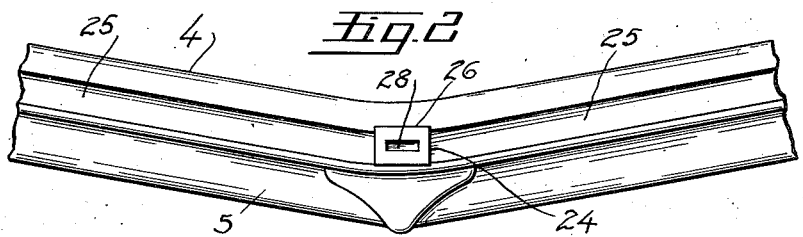
Fig. 2
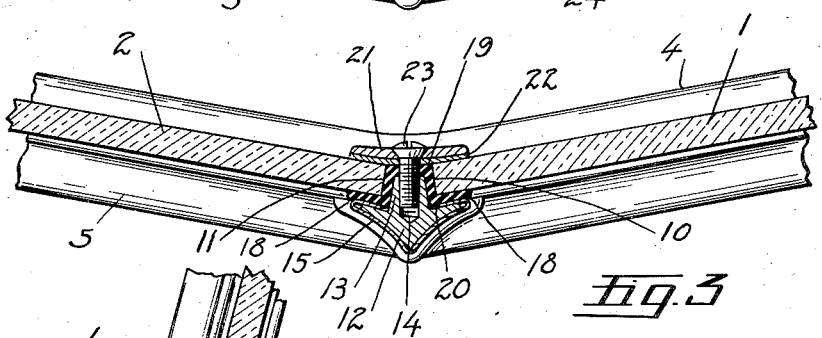
Fig. 3
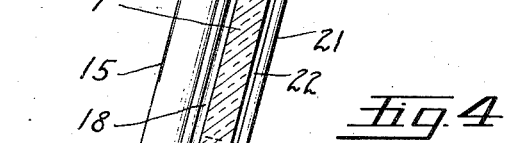
Fig. 4
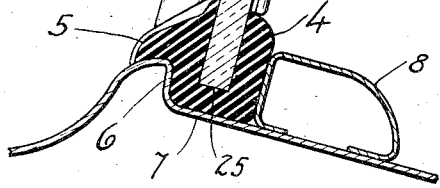
INVENTOR.
ALFRED J. FISHER
BY
Barnes, Kisselle, Laughlin & Raisch
ATTORNEYS.

Nov. 24, 1936. A. J. FISHER 2,061,760
DIVISION MOLDING FOR A WINDSHIELD
Filed July 5, 1935 2 Sheets-Sheet 2
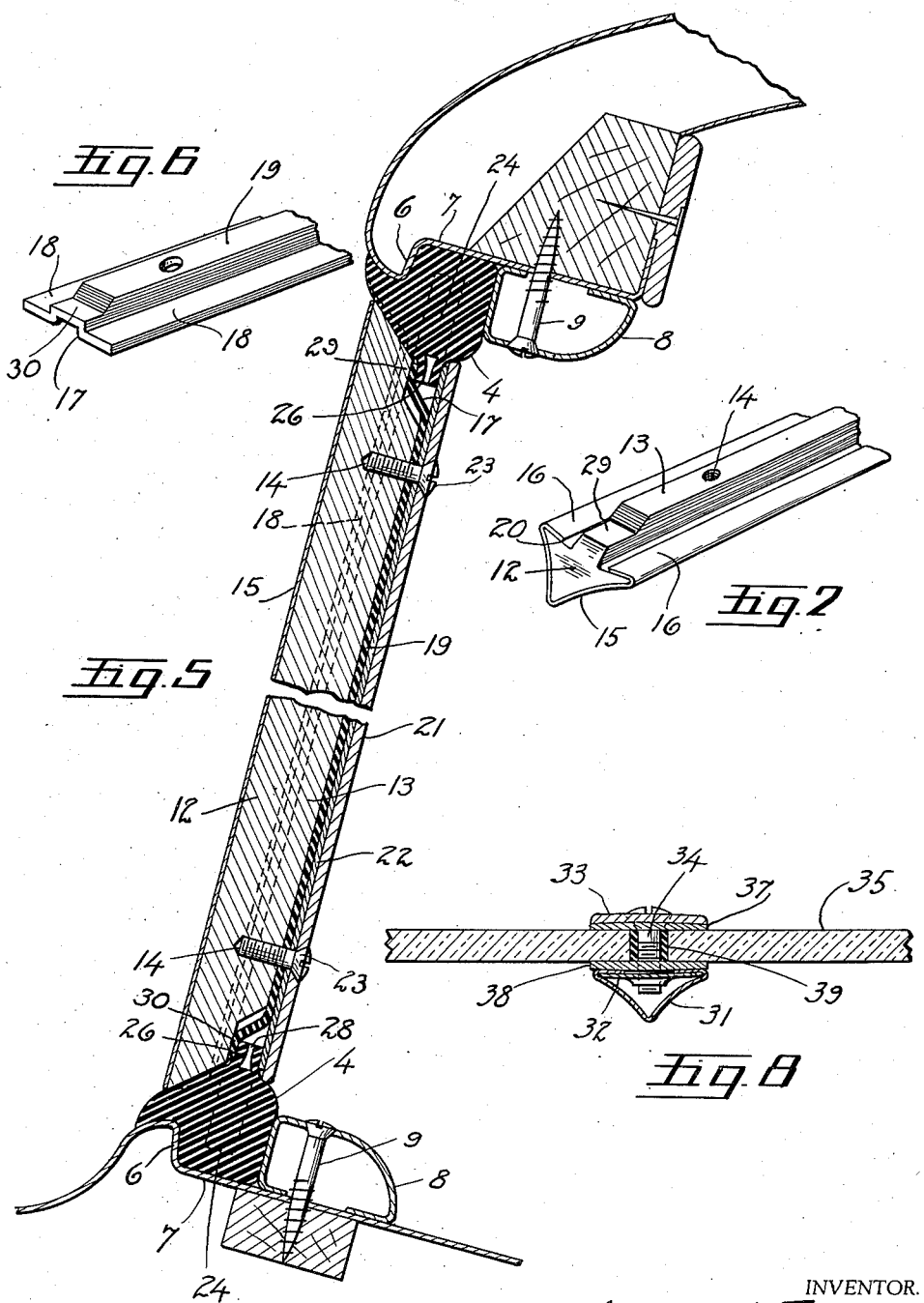
INVENTOR.
ALFRED J. FISHER
BY
Barnes, Kisselle, Laughlin & Raisch
ATTORNEYS Patented Nov. 24, 1936

2,061,760

UNITED STATES PATENT OFFICE 2,061,760

DIVISION MOLDING FOR A WINDSHIELD

Alfred J. Fisher, Detroit, Mich., assignor to General Motors Corporation, Detroit, Mich., a corporation of Delaware Application July 5, 1935, Serial No. 29,891

9 Claims. (Cl. 296—84)

This invention relates to a division molding assembly for an automotive vehicle windshield.

A V windshield comprising two plates of glass which have their adjacent edges along the apex of the V provided with a molding is old. The moldings heretofore used have been wide and thick, consequently providing a considerable blind spot or obstruction to the vision of the driver and much difficulty has been encountered in effectively sealing such a windshield to prevent air and water leaks.

It is the object of this invention to produce a division molding for a V windshield which provides practically no obstruction to the vision and which effectively seals the windshield against water and air leaks.

In the drawings:

Fig. 1 is a front elevation showing the V windshield and division molding.

Fig. 2 is a detail view of the weatherstrip.

Figs. 3, 4, and 5 are sections along the lines 3—3, 4—4, and 5—5 respectively of Fig. 1.

Fig. 6 is a detail of the rubber weatherstrip for the division molding.

Fig. 7 is a detail of the molding.

Fig. 8 is a section showing the modified form of the molding.

Referring to the drawings there is shown a V windshield comprising glass panels 1 and 2 mounted in the windshield opening 3. The windshield opening 3 is provided completely around its periphery with a weatherstrip 4 in the form of a channel which receives and effectively seals the edges of the panels 1 and 2. The weatherstrip 4 is preferably made from soft rubber and is provided with a lip 5 which overlaps and is distorted by the assembly of panels 1 and 2 in the windshield frame so that it tightly hugs the windshield frame giving it a neat outline and weatherproof seal. The body members which define the windshield opening may be considered as a window frame and is provided with a shoulder 6 and a base 7 throughout its periphery against which the weatherstrip seats. After the weatherstrip 4 and the panels 1 and 2 have been positioned in the opening 3, the garnish molding 8 is secured in place by the screws 9 so that it crowds the rubber weatherstrip against the panels 1 and 2 and the shoulder 6 and secures the windshield in place.

After the windshield panels 1 and 2 have been mounted in the windshield opening then their adjacent edges 10 and 11 are sealed by a division molding. This division molding comprises a V shaped die-cast member 12 having a rib 13 provided with a plurality of tapped holes 14. The die-cast insert 12 is provided with a chromium plated or otherwise ornamented sheet metal scalp member 15, the edges 16 of which are turned inwardly to clamp the scalp to the insert 12. A weatherstrip 17 preferably of soft rubber is mounted over the rib 13 and the return bent edge 16 of the scalp. This weatherstrip 17 comprises a pair of lips 18 and a hollow rib 19 which fits over the rib 13. Preferably the weatherstrip 17 is separate and formed independently of the weatherstrip 4. However, the weatherstrip 17 may be molded integrally or homogeneously with the weatherstrip 4. Thus, the weatherstrip 4, including the dividing strip 17, will come as a one-piece weatherstrip extending completely around the peripheries of both windshield panels 1 and 2.

The molding 12 with the weatherstrip 17 is positioned on the outside of the panels 1 and 2 with the rib portions 13 and 19 between the adjacent ends 10 and 11 of the panels 1 and 2, and with the lips 18 of the weatherstrip between the panels 1 and 2 and the shoulder portions 20 of the molding. Thereafter a flat ornamental strip 21 is positioned on the inside of the windshield over the joints 10 and 11 of the panels with a suitable cushioning member such as the strip 22 placed between the panels 1 and 2 and the strip 21. Thereafter screws 23 are passed through the strip 21 into the tapped openings 14 to draw the molding assembly tightly into engagement with the panels 1. The turning down of the screws 23 compress or distort the rubber lips 11 between the shoulders 20 and the edges of the glass panels 1 and 2 to effect a weathertight seal.

To prevent air and water leakage at the top and bottom of the molding the weatherstrip 4 is provided with a dividing web 24 which, as shown in Fig. 5, may be molded integrally with the weatherstrip 4. This dividing web 24 divides the groove 25 in the weatherstrip 4 and seals the end edges 10 and 11 of the panels within the weatherstrip channel 4 and is provided with a projection 26 which extends upwardly beyond the top of the weatherstrip and between the molding 12 and the retainer strip 21. This projection 26 may be provided with a central opening 28 which gives it greater distortability. To accommodate this projection 26 the rib 13 is provided with a notch 29 at each end and the weatherstrip 17 is provided with a notch 30 at each end. In the assembly of the molding to the window the projection 26 is pressed between the ends of the inside plate 21 and the ends of the molding 12.

It will be noted that not only both of the window panels 1 and 2 are completely floated in rubber but that the entire molding assembly is floated in rubber.

In Figure 8 there is shown a modified form of the invention such as the division molding assembly for the rear window. In the modified form the molding scalp 31 is clamped about an insert 32 in the form of a metal strip. The rear window 35 is provided with a plurality of vertically aligned holes which receive the cylindrical rubber bushings 39. The inside ornamental strip 33 through which the screws 34 are passed, as well as the outside molding, are spaced from the window panel 35 by the weatherstrips 37 and 38. Screws 34 are passed through the cylindrical rubber bushings 39 and the weatherstrips 37 and 38. The insert 32 is provided with a plurality of drilled and tapped holes into which the screws 34 are screwed thus drawing the molding and the weatherstrips tightly against the window panel 35.

In the assembly of both these division moldings into the windshield and rear window openings a suitable cement may be applied to the surfaces of the weatherstrips 17, 22 and 37, 38 which contact with the glass panels to cement these weatherstrips to the panels.

I claim:

1. A window assembly for an automotive vehicle comprising a pair of fixed glass panels for closing the opening having their adjacent vertical edges spaced, a fixed rubber weatherstrip in the form of a continuous loop surrounding the window opening and sealing the outer edges of the panels and having a homogeneous vertical piece extending from the top to the bottom of the window opening in the gap between adjacent vertical edges of the fixed glass panels for sealing the adjacent vertical edges of these panels.

2. A window assembly for an automotive vehicle comprising a pair of panels for closing the window opening having their adjacent edges spaced, a cushion weatherstrip for sealing the edge of the window in the opening and serving as a floating support for the window panels, a molding secured to the adjacent edges of the window panels for sealing the gap therebetween, the molding being spaced at each end from the window opening, and a weatherstrip cushion for sealing the ends of the molding in the window opening and serving as a floating support for the molding.

3. A window assembly for an automotive vehicle comprising a pair of panels for closing the window opening having their adjacent edges spaced, a rubber weatherstrip in the form of a channel for sealing the edge portions of the window in the opening and serving as a floating support for the window panels, a molding secured to the adjacent edges of the window panels for sealing the gap therebetween, the molding being spaced at each end from the window opening and abutting the rubber weatherstrip to seal the ends of the molding in the window opening and serve as a floating support for the same.

4. In a window assembly having a pair of window panels for closing the window opening with their adjacent edges spaced to form a gap, a molding for sealing the said gap comprising an outer member having a longitudinal rib positioned in the said gap and a shoulder on each side of the rib for overlapping the edges of the window panels on opposite sides of the gap, a distortable weatherstrip having a pair of lips positioned between the shoulders and the outer face of the window panels and wall portions extending between the rib and the edges of the panels, a securing plate positioned over the gap and overlapping the inside faces of the window panels adjacent the gap, the ends of the molding being spaced from the window opening, a rubber weatherstrip positioned between each end of the molding and the window and having a portion extending upwardly between the outside member and the inner plate and compressed between the said members and the window opening to seal the ends of the molding in the opening, and means for securing the inside plate to the outer member to compress the weatherstrip to effect a weather-tight seal for the gap between the window panels.

5. In a window assembly having a pair of window panels with their adjacent edges spaced to form a gap, a molding for sealing the gap comprising an outer member having a V cross section and a longitudinal rib positioned in the said gap and a shoulder on each side of the rib for overlapping the outer faces of the panels on opposite sides of the gap the said rib projecting into the said gap and terminating between the inside and outside faces of said panels, a distortable weatherstrip having a pair of lips positioned between the shoulders and the outer faces of the window panels and wall portions extending between the rib and the adjacent edges of the panels, a securing member in the form of a relatively thin flat plate positioned over the gap and overlapping the inside faces of the window panel adjacent the gap, and means passing through the inside securing plate and the gap and into the rib of said outer member for compressing the weatherstrip to effect a weather-tight seal for the gap between the window panels.

6. In a window assembly having a pair of window panels for closing a window frame with their adjacent edges spaced to form a gap, a weatherstrip in the form of a channel section for receiving the top and bottom edges of the said panels and having a lip extending outwardly from the outer side wall of the panel and overlapping the outer edge of the window frame, a molding for sealing the said gap comprising an outer member having a longitudinal rib positioned in the said gap and a shoulder on each side of the rib for overlapping the edges of the window panels on opposite sides of the gap, a distortable weatherstrip having a pair of lips positioned between the shoulders and the outer face of the window panels and wall portions extending between the rib and the edges of the panels, a securing plate positioned over the gap and overlapping the inside faces of the window panels adjacent the gap, means for securing the inside plate to the outer member to compress the weatherstrip to effect a weather tight seal for the gap between the window panels, the top and bottom ends of the said molding engaging the said weatherstrip in spaced relation with the window frame, the overhanging lip of the weatherstrip serving as a weather-tight seal between the bottom of the outside molding member and the window frame.

7. A window assembly for an automotive vehicle comprising a pair of glass panels for closing the opening having their adjacent vertical edges spaced, a rubber weatherstrip in the form of a continuous loop surrounding the window opening and sealing the outer edges of the panels and a vertical weatherstrip extending from the top to the bottom of the window opening in the gap between adjacent vertical edges of the glass panels for sealing the adjacent vertical edges of these panels, and a molding secured to the adjacent edges of the glass panels for securing the vertical weatherstrip in the gap between the adjacent vertical edges of the panels and in weather-tight relation therewith.

8. A window assembly for an automotive vehicle comprising a pair of glass panels for closing the opening having their adjacent vertical edges spaced, a rubber weatherstrip in the form of a continuous loop surrounding the window opening and sealing the outer edges of the panels and a vertical rubber weatherstrip extending from the top to the bottom of the window opening in the gap between adjacent vertical edges of the glass panels for sealing the adjacent vertical edges of these panels, and a molding comprising inside and outside members overlapping the adjacent edges of the panels and the vertical portion of the weatherstrip, and means for securing the said members together whereby the vertical weatherstrip is clamped between and pressed against the adjacent edges of the glass panels to seal the same.

9. A window assembly for an automotive vehicle comprising a window frame, a pair of panels mounted in the said frame for closing the window opening and having their adjacent edges spaced, a rubber weatherstrip in the form of a channel mounted in the window frame for sealing the edge portions of the window panel and serving as a floating support for the window panel, a rubber web extending across the channel from one upstanding wall to another and between the said panels for sealing the edges of these panels within the rubber weatherstrip channel, a molding secured to the adjacent edges of the window panels for sealing the gap therebetween, the molding being spaced at each end from the window frame and abutting the rubber channel weatherstrip at the said web to seal the ends of the molding in the window opening and serve as a floating support for the same.

ALFRED J. FISHER.